Feb. 24, 1970　　　　M. R. DOOLITTLE　　　　3,497,730
ROTARY AND LINEAR POLYPHASE MOTORS HAVING STAGGERED
FIELD WINDING ARRANGEMENTS
Filed Jan. 19, 1968　　　　　　　　　　　　　　2 Sheets-Sheet 1

INVENTOR
MAC R. DOOLITTLE
BY
ATTORNEYS

INVENTOR
MAC R. DOOLITTLE
BY
ATTORNEYS

United States Patent Office 3,497,730
Patented Feb. 24, 1970

3,497,730
ROTARY AND LINEAR POLYPHASE MOTORS HAVING STAGGERED FIELD WINDING ARRANGEMENTS
Mac R. Doolittle, Cassopolis, Mich., assignor to Clark Equipment Company, a corporation of Delaware
Filed Jan. 19, 1968, Ser. No. 699,116
Int. Cl. H02k 41/00
U.S. Cl. 310—13                                8 Claims

ABSTRACT OF THE DISCLOSURE

A staggered field winding arrangement for reducing speed and increasing torque or traction in rotary and linear polyphase motors. Each motor includes a stator assembly having the field winding for each phase of the motor arranged in multiple spaced coils on a separate stator section. The stator sections are disposed in staggered relation to each other such that the poles thereon defined by the field winding coils are staggered relative to the poles of the next adjacent phase windings, thereby increasing the number of poles per unit length along the stator assembly.

BACKGROUND OF THE INVENTION

The present invention relates generally to A-C electrical motors, and more particularly to polyphase electric motors employing new and useful staggered field winding arrangements.

In the design of rotary polyphase motors, such as rotary polyphase induction motors, it has been conventional to place plural primary field windings in coils arranged in a circular configuration along either the inner surface of a generally annular stator member or the outer surface of a generally cylindrical rotor member.

For example, the usual structure of a rotary polyphase induction motor is characterized by a cylindrical rotor member carrying plural secondary field windings in coils wound in slots on its outer periphery and by an encircling annular stator member carrying plural primary field windings in coils wound in slots on its inner periphery. The primary field windings commonly are arranged for use with a three-phase power supply, with three sets of interspaced generally coplanar multipolar coil groups spaced one-third of a pole pitch apart. The superposition of the three stationary alternating magnetic fields produced by the three-phase primary field windings results in a rotatably moving generally sinusoidal magnetic field. The direction of rotation of the resulting moving magnetic field may be reversed by reversing the connections for one of the three phases.

There are in present use a variety of other types of practical rotary polyphase motors having primary or secondary field windings that are basically similar to the respective primary or secondary field windings of a rotary polyphase induction motor. These include most polyphase synchronous motors, polyphase series-wound motors, and the like. Standard handbooks and other literature may be consulted for particular details of any of these known rotary polyphase motors.

In the design of linear polyphase motors, it has been conventional to provide linear primary field windings which may be perceived as circular field windings that have been cut and laid flat. The plural primary field windings are generally arranged in coils in a linear configuration along a suitable surface of an elongated stator member. At present, linear polyphase motors are used principally in highly specialized applications, and the known variety of practical linear polyphase motors is not as great as the known variety of practical rotary polyphase motors.

With known field winding arrangements, only a limited number of individual coils can be carried on a given stator member, whether slotted cores, salient cores, or other means are used for holding the wound coils. As a result, there are physical limitations on the number of poles that can be provided with known field winding arrangements. This is significant in view of the speed relationships and torque or traction relationships of rotary and linear polyphase motors.

The speed of rotary polyphase motors is generally inversely related to the number of poles defined by the primary field windings and the torque thereof is generally directly related to the number of poles. The speed of a linear polyphase motor also is generally inversely related to the number of poles defined by the primary field windings. The term "torque" has no direct application to linear motors. The term "traction" is employed herein to refer to the force produced on the slider member of a linear motor to effect translational movement thereof, the force being produced by a moving magnetic field along the stator. The traction of a linear polyphase motor is generally directly related to the number of poles defined by the primary field windings, and is established by analogy with the torque of a rotary polyphase motor.

SUMMARY OF THE INVENTION

It is one of the primary objects of the present invention to provide rotary and linear polyphase motors having new and useful field winding arrangements, each arrangement employing stator supported field windings staggered in a manner to provide a greater number of poles per unit length along the stator assembly than can be obtained with known field winding arrangements.

Another object of the present invention is to provide rotary and linear polyphase motors having relatively movable field winding support means and armature means, the field winding support means of each motor including a plurality of separate parallel support members each of which is adapted to support the field winding for a separate phase of the polyphase motor arranged thereon in multiple spaced coils, the support members being disposed in a manner to stagger the poles defined by the coils of each field winding relative to the poles of the adjacent field windings.

Another object of the present invention is to provide rotary and linear polyphase motors as described wherein the armature means for each motor is movable relative to the field winding support means at equal distances from and on the same side of the separate support portions thereof.

A further object of the present invention is to provide a rotary polyphase motor wherein the stator assembly therefor comprises a plurality of similar annular relatively fixed sections adapted to support the field windings of the respective phases of the motor, and wherein the armature means comprises a generally cylindrical rotor supported for rotational movement about an axis coaxial with the center axes of the annular stator portions.

Another object of the present invention is to provide a linear polyphase motor wherein the stator assembly is generally planiform and comprises a plurality of separate spaced parallel elongated support members each of which is staggered relative to the others and is adapted to support the field winding for a separate phase of the motor, and wherein the armature means comprises a generally planiform slider member arranged for linear movement in parallel spaced relation to the stator assembly.

Another object of the present invention is to provide rotary and linear polyphase motors as described for use with a three-phase power supply.

Further objects and advantages of my invention, together with the organization and manner of operation thereof may best be understood by reference to the following description of preferred embodiments of the invention when taken in conjunction with the accompanying drawings, in which like reference numerals desigate like parts throughout the several views.

DESCRIPTION OF THE PREFERRED EMBODIMENTS

Figure 1:
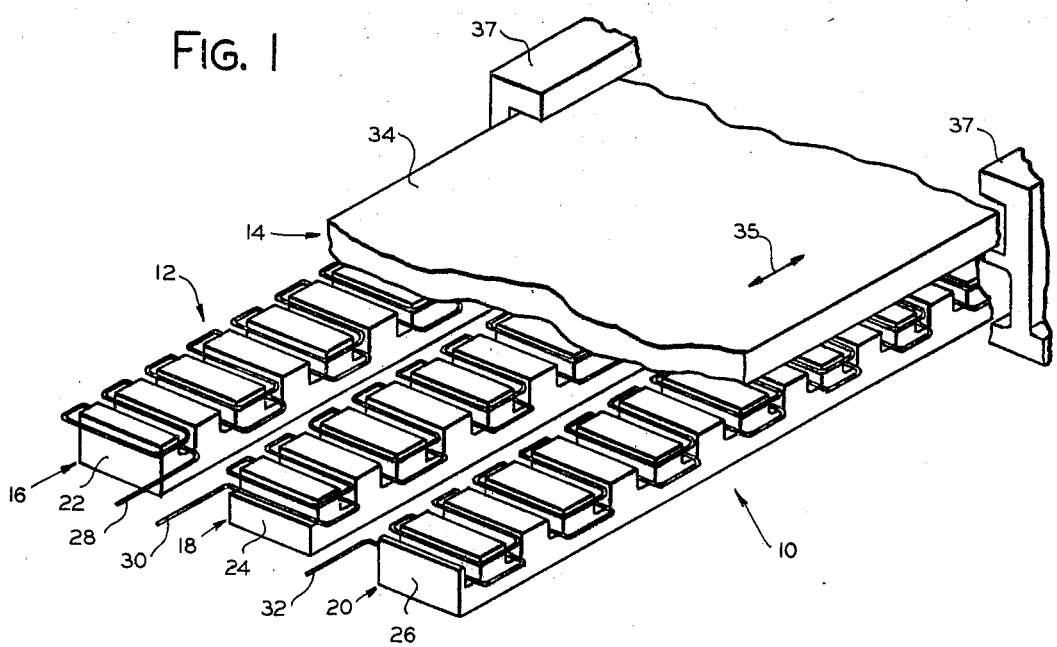
FIGURE 1 is a fragmentary perspective view of a simplified linear three-phase motor embodying the principles of the present invention.
Figure 2:
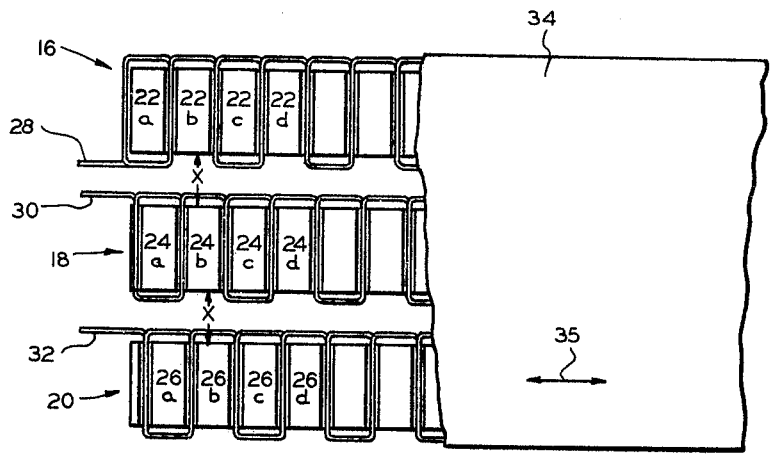
FIGURE 2 is a plan view of the motor illustrated in FIGURE 1.

Referring now to the drawings, FIGURES 1 and 2 illustrate schematically a linear polyphase motor, indicated generally at reference numeral 10, constructed in accordance with one preferred embodiment of the present invention. For purposes of description, certain structural details of the linear polyphase motor 10 which, per se, form no part of the present invention are not shown. Such structural details are conventional and may be readily supplied by those skilled in the art.

The linear polyphase motor 10 includes field-winding support means comprising a planiform stator assembly, indicated generally at 12, and planiform armature means, indicated generally at 14. For purposes of illustration, the stator assembly 12 will be described as serving to support the field windings of a three-phase electric motor, it being understood that the inventive concepts underlying the present invention may be readily applied to polyphase motors employing any conventional multiphase power supply. The stator assembly 12 includes a plurality of separate field winding support sections, three separate spaced parallel longitudinally extending support sections or members being shown at 16, 18 and 20. Each of the separate stator support members serves to support a field winding for a separate phase of the three-phase motor.

The three field winding support members 16, 18 and 20 are generally identical in configuration and are disposed in fixed relation to each other in a conventional manner. The stator support member 16 comprises a generally elongated base portion 22 having a plurality of equidistantly spaced upstanding pole or core pieces 22a, 22b, etc., formed integral thereon. The core pieces 22a, 22b, etc., are of equal vertical extent relative to the base portion 22 and are interspaced to allow a winding conductor to be suitably supported thereon in a manner as more fully described below.

The support member 18 includes a generally elongated base portion 24 having a plurality of upstanding pole or core pieces 24a, 24b, etc., integrally disposed thereon in similar fashion to the core pieces 22a, 22b, etc., of the stator support member 16. Similarly, the stator support member 20 includes a generally elongated base portion 26 having a plurality of equidistantly spaced upstanding pole or core pieces 26a, 26b, etc., integrally formed thereon.

A suitable conductor 28 comprising the conductor for one phase winding of the three-phase motor 10 is wound around the spaced core pieces 22a, 22b, etc., of the stator support member 16 to provide a plurality of spaced coils corresponding in number to the upstanding core pieces. The conductor 28 is wound in alternate clockwise and counterclockwise direction about adjacent upstanding core pieces when considered along the longitudinal length of the stator support member 16 as viewed in FIGURES 1 and 2. By so winding the conductor 28 in alternate clockwise and counterclockwise direction, poles of alternate polarity are provided at the respective consecutive core pieces 22a, 22b, etc., in a known manner.

The stator support members 18 and 20 have suitable conductors 30 and 32, respectively, supported thereon in similar fashion to conductor 28 on stator support member 16. The conductors 30 and 32 each carry a separate phase of the three-phase motor 10 distinct from the phase carried by conductor 28, and each is wound in similar alternating clockwise and counterclockwise coils about the corresponding core pieces to provide alternate magnetic poles in similar fashion to the aforedescribed coils of conductor 28 on stator support member 16. It will be understood that the conductors 28, 30 and 32 must be insulated between coil layers and from the core pieces and motor frame.

In assembly, the stator support members 16, 18 and 20 are separated by equal transverse distances $x$ (FIGURE 2) in fixed parallel positions, with the respective base portions 22, 24 and 26 being longitudinally staggered such that the pole pieces on each base portion are staggered with respect to the pole pieces on the next adjacent base portions. Preferably, for a three-phase power supply the pole pieces of the respective phase windings are staggered a distance of one-third pole, the pole distance being defined as the distance between centers of adjacent pole or core pieces on the respective base portions of the stator support members. For example, a longitudinal one-third pole shift is provided between the adjacent stator support members 16 and 18, and a longitudinal one-third pole shift is provided between adjacent stator support members 18 and 20, thereby resulting in a longitudinal pole shift between the stator support members 16 and 20 of two-thirds pole.

The conductors 28, 30 and 32 of the respective phases of the three-phase motor 10 are connected in a conventional manner to a three-phase AC power supply. Connection of each of the conductors 28, 30 and 32 to a respective phase of the three-phase power supply effects a moving magnetic field along each of the respective stator support members 16, 18 and 20 in a conventional manner. By separating and longitudinally staggering or shifting the stator support members 16, 18, and 20 such that the poles thereon are staggered a distance of one-third pole relative to the poles of adjacent phase windings as above described, a greater number of poles per unit length along the longitudinal axis of the stator assembly 12 is obtained.

The armature means 14 comprises a generally planiform slider member 34 made of a suitable material as known in conventional motor construction. The slider member 34 is supported in parallel spaced relation above the pole pieces of the respective stator support members 16, 18 and 20 of the stator assembly 12 for translational movement relative to the stator assembly along the longitudinal axis thereof, as indicated by arrow 35. The slider member 34 may be supported for such movement by any suitable conventional means, FIGURE 1 showing the slider member supported by and guided in opposed guide channel means 37. Preferably, antifriction means such as conventional bearings (not shown) are provided within the channel slots to reduce friction during sliding movement of the slider member 34. The guide means 37 support slider member 34 at equal distances from and on the same side of the three stator support members 16, 18 and 20 of the stator assembly. In application, the slider member 34 may serve as a support means upon which material may be disposed for movement in a direction along the longitudinal axis of the stator assembly 12, as in material handling systems and the like.

Movement of the slider member 34 of armature means 14 is effected by the aforedescribed moving magnetic fields along the respective stator support members 16, 18 and 20 according to theories well known in the field of electric motor operation. Briefly, the mechanical force or traction exerted on the slider member 34 to effect movement thereof is proportional to the magnetic flux of the fields about the core pieces. As the slider member 34 is supported for translational movement relative to the fixed stator assembly 12, the traction force will effect movement of the slider member in the direction of the moving magnetic field along the stator assembly. In accordance with known principles, the translational speed of the slider member 34 of armature means 14 is proportional to the number of poles per unit length along the stator assembly. By separating and staggering the stator support members 16, 18 and 20 in a manner as aforedescribed, the number of pole pieces per unit length along the stator assembly is increased by a multiple of three, thereby reducing the translational speed of the slider member 34 while increasing the traction or moving force therein.

Figure 3:
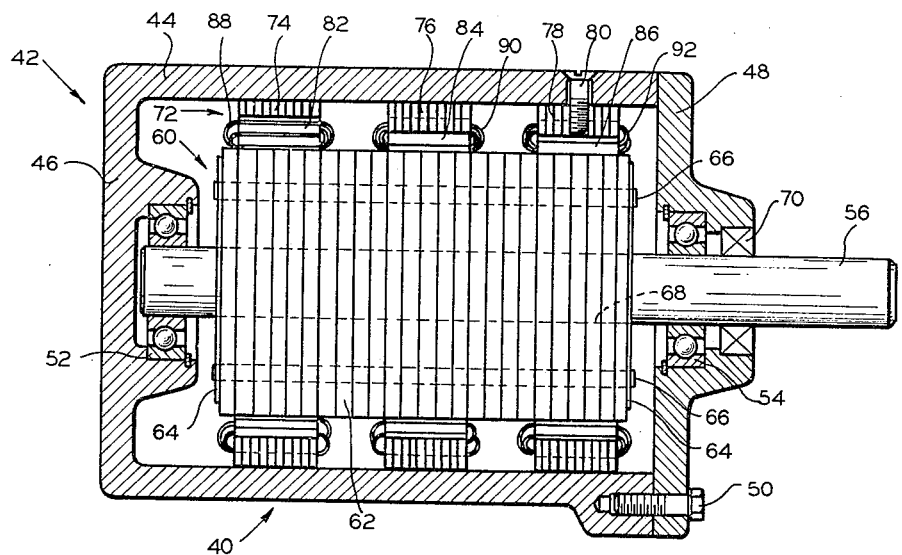
FIGURE 3 is a longitudinal sectional view of a rotary three-phase motor embodying the principles of this invention.

FIGURE 3 illustrates a rotary polyphase motor, indicated generally at reference numeral 40, constructed in accordance with another preferred embodiment of the present invention. The rotary polyphase motor 40 comprises a three-phase AC electric motor having a generally cylindrical housing 42. The housing 42 includes an annular wall portion 44 and a closed end wall 46 which define an axial cylindrical bore or cavity therein. An end plate 48 is suitably secured to the open end of the annular body 44 through bolts 50. The end wall 46 and the opposing end plate 48 support anti-friction bearings 52 and 54, respectively, such that the bearings are disposed in axial alignment. The anti-friction bearings 52 and 54 rotatably support a shaft 56 in axial position within the cylindrical cavity in the housing 42.

The shaft 56 forms the driven shaft of the motor 40 and supports an armature means 60 for rotational movement within motor housing 42. The armature means 60 comprises a cylindrical laminated rotor member 62 made from a plurality of suitable annular plates fixedly assembled between end plates 64 by a plurality of longitudinally extending bolts 66 in a conventional manner. The rotor member 62 has an axial bore 68 therethrough to suitably receive the motor shaft 56 for conjoint rotation therewith.

Preferably a suitable conventional sealing means 70 is secured within the end plate 48 about the outer end of shaft 56 to prevent the entry of dust and other foreign matter into the interior of the motor housing 42.

Field-winding support means comprising a stator assembly, indicated generally at 72, is disposed within the cylindrical cavity defined by the motor housing 42 for operative association with the armature means 60. The stator assembly 72 serves to support the field windings for the three phases of the three-phase rotary motor 40 and includes three separate axially spaced annular stator support members or sections 74, 76 and 78. The stator sections 74, 76 and 78 are substantially identical in configuration and are coaxially disposed about the outer peripheral surface of the cylindrical armature 60 in conventional spaced relation therewith. Each of the stator sections 74, 76 and 78 is retained in fixed angular and axial position within the inner cylindrical cavity of motor housing 42 by suitable means such as machine screws, one of which is shown at 80. Each of the stator sections 74, 76 and 78 preferably comprises a plurality of conventional laminations suitably secured in axial aligned relation.

The annular stator section 74 has an even multiple of equidistantly circumferentially spaced pole or core pieces 82 formed integral about the inner peripheral surface thereof, each core piece being directed radially inwardly with its innermost end surface being radially spaced from the outer peripheral surface of the cylindrical armature means 60. The core pieces 82 of the stator section 74 are interspaced to define radial slots therebetween to receive the field winding conductor for one phase of the three-phase power supply to the polyphase motor 40. For purposes of illustration, the core pieces 82 may be considered as analogous to the pole pieces 22a, 22b, etc., of the planiform stator support member 16 of the above-described linear polyphase motor 10.

As noted, stator section 76 and 78 are of generally identical configuration to stator section 74. Each of the stator sections 76 and 78 includes a like number of equidistantly circumferentially spaced integral core pieces 84 and 86, respectively, which may be analogized to the core pieces 24a, 24b, etc., and 26a, 26b, etc., of the respective above-described planiform stator support members 18 and 20. The annular stator sections 76 and 78 each serve to support a field winding conductor corresponding to a separate phase of the three-phase power supply in a conventional manner as hereinafter described.

Figure 4:
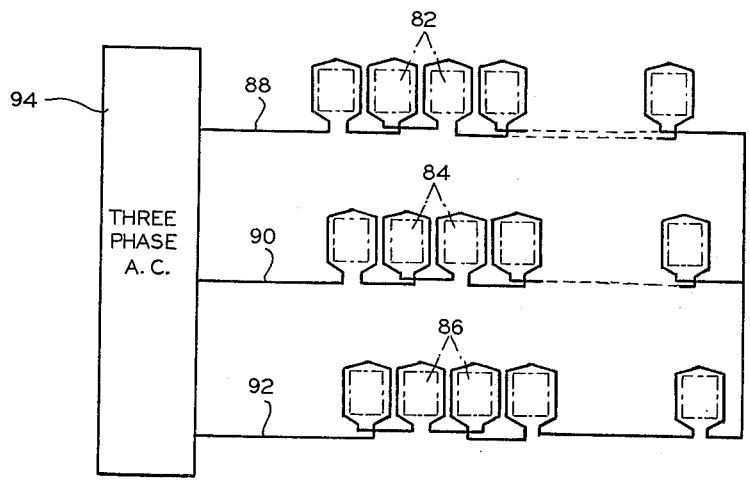
FIGURE 4 is a field winding diagram applicable to the motor of FIGURE 3.

A suitable conductor 88 comprising the field winding for one phase of the three-phase power supply to the rotary motor 40 is wound about the spaced core pieces 82 of the stator section 74 to establish magnetic poles for one phase of the motor. Noting FIGURE 4, the conductor 88 is shown schematically as being wound in alternate clockwise and counterclockwise direction about consecutive core pieces 82 of stator section 74 to establish magnetic poles of alternate polarity.

Suitable conductors 90 and 92, comprising the field winding conductors for the remaining two phases of the three-phase supply to motor 40 are similarly wound in alternate clockwise and counterclockwise directions about the corresponding core pieces 84 and 86, respectively, of stator sections 76 and 78 in similar fashion to the winding of conductor 88 about the core pieces 82 of stator section 74. Accordingly, the conductors 90 and 92 establish magnetic poles of alternate polarity about their respective consecutive core pieces. The phase winding conductors 88, 90 and 92 are suitably connected in a conventional manner to a three-phase AC voltage supply 94. It will be understood that the conductors 88, 90 and 92 are suitably insulated between coil layers and from the core pieces and motor housing.

In assembly, the respective stator sections 74, 76 and 78 of the stator assembly 72 are affixed in relative angular relation within the cylindrical cavity in the motor housing 42 such that the respective core pieces 82, 84 and 86 are angularly staggered a distance of one-third pole relative to each other, the pole distance being defined as the circumferential distance between mean centers of adjacent core pieces on each stator section. The angular staggering of core pieces 82, 84 and 86 through relative angular positioning of stator sections 74, 76 and 78 as aforedescribed is schematically represented in plan view in FIGURE 4. The poles defined by the conductor windings on the corresponding core pieces 82, 84 and 86 are staggered or offset a distance of one-third pole when viewed from left to right, as opposed to being in vertical alignment.

Relative angular staggering or shifting of the respective stator sections 74, 76 and 78 of the stator assembly 72 as above described serves to increase the number of pole or core pieces, and thereby the number of magnetic poles, per circumferential unit length about the armature means 60 by threefold. The effect of this staggered core piece arrangement on the speed and torque of the polyphase motor 40 is to decrease the rotational speed of the motor 40 while increasing the torque thereof.

The above described embodiments of my invention have described the field windings as being disposed on relatively fixed stator assemblies with the armature means being movable relative to the stator assemblies. It will be understood that the field windings can readily be supported on movable stator support assemblies in accordance with the present invention while the corresponding armature means are disposed in fixed position.

While preferred embodiments of the present invention have been exemplified as linear and rotary three-phase AC electric motors, the inventive concepts underlying the illustrated embodiments are not to be limited to the specific polyphase motors described. The inventive concepts underlying my invention may be readily applied to many types of rotary polyphase motors, such as induction motors, synchronous motors, series wound motors and the like, as well as many types of linear polyphase motors. Accordingly, it will be obvious to those skilled in the art that changes and modifications may be made in the preferred embodiments of my invention without departing from the invention in its broader aspects.

What I claim is:

1. A continuous motion A.C. polyphase motor comprising field-winding support means including a plurality of separate support members, a field winding corresponding to one phase of the polyphase motor supported on each of said support members, each of the field windings being arranged on its associated support member in multiple spaced coils defining spaced poles, said support members being fixedly disposed to stagger the field winding coils of each phase relative to the field winding coils of the remaining phases to increase the number of poles per unit length along the field-winding support means, and armature means operatively associated with said support members for movement relative thereto at equal distances from and one the same side of said support means.

2. A polyphase motor as defined in claim 1 wherein said plurality of separate support members are disposed in parallel spaced relation.

3. A polyphase motor as defined in claim 1 wherein the spaced coils of said field windings are equidistantly spaced along their respective support members.

4. A polyphase motor as defined in claim 1 wherein the motor comprises a three-phase electric motor, and wherein said field winding support means comprises three separate parallel support members, each of the field windings corresponding to one phase of the three-phase motor.

5. A polyphase motor as defined in claim 3 wherein said support members are positioned such that the field winding coils for each phase are staggered a distance of one-third pole relative to the next adjacent phase coils.

6. A polyphase motor as defined in claim 1 wherein said field-winding support means comprises a stator assembly including a plurality of generally planiform spaced stator sections, said stator sections comprising similarly shaped elongated stationary support members, and wherein said armature means comprises a generally planiform slider member supported for continuous translational movement in parallel relation to said stator assembly.

7. A polyphase motor as defined in claim 6 wherein said stator assembly includes separate planiform stator support members, each stator support member having a plurality of core pieces equidistantly spaced longitudinally therealong, said stator support members being fixedly shifted in a manner to stagger the core pieces of each stator support member a distance of one-third pole relative to the core pieces disposed on adjacent spaced stator support members.

8. A polyphase motor as defined in claim 1 wherein said field-winding support means comprises a stator assembly including three separate fixedly positioned axially spaced stator sections, said stator sections comprising similarly shaped annular axially aligned stationary members, and wherein said armature means comprises a cylindrical rotor member supported for rotary movement about an axis coaxial with the centers of the axially aligned stator sections.

References Cited

UNITED STATES PATENTS

| | | | |
|---|---|---|---|
| 2,774,922 | 12/1956 | Thomas | 318—162 |
| 3,089,069 | 5/1963 | Thomas | 318—138 |
| 3,218,489 | 11/1965 | Sadler | 310—13 |
| 3,281,655 | 10/1966 | Blasingame | 310—49 X |
| 3,292,065 | 12/1966 | Fredrickson | 318—135 |
| 3,391,289 | 7/1968 | Danilewicz et al. | 310—37 |

WARREN E. RAY, Primary Examiner

U.S. Cl. X.R.

310—15, 49, 166, 180